Sept. 12, 1933.  A. S. JOHNSON  1,926,150
TRIMMING MACHINE
Filed Jan. 28, 1931
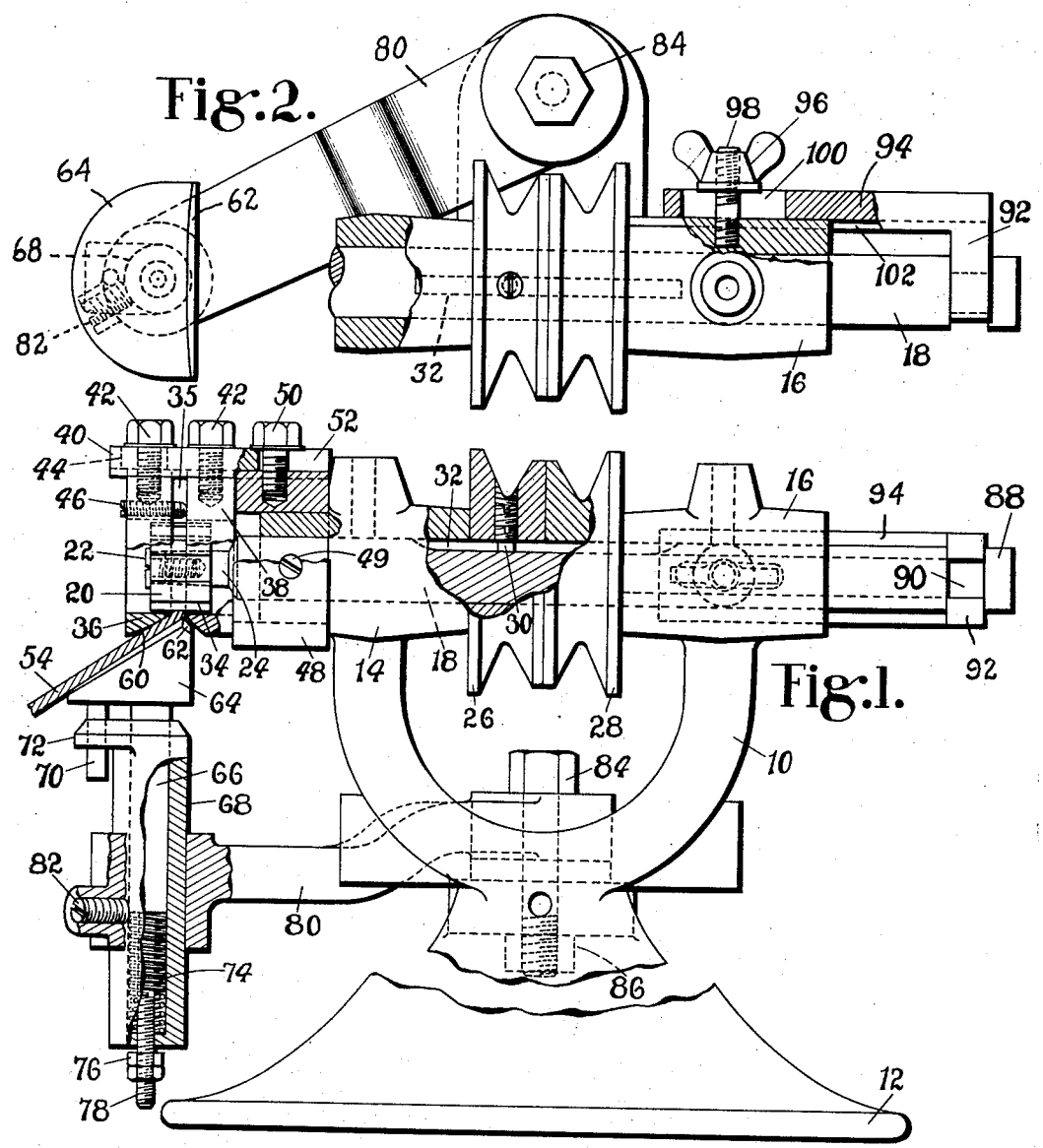
Fig. 1.
Fig. 2.
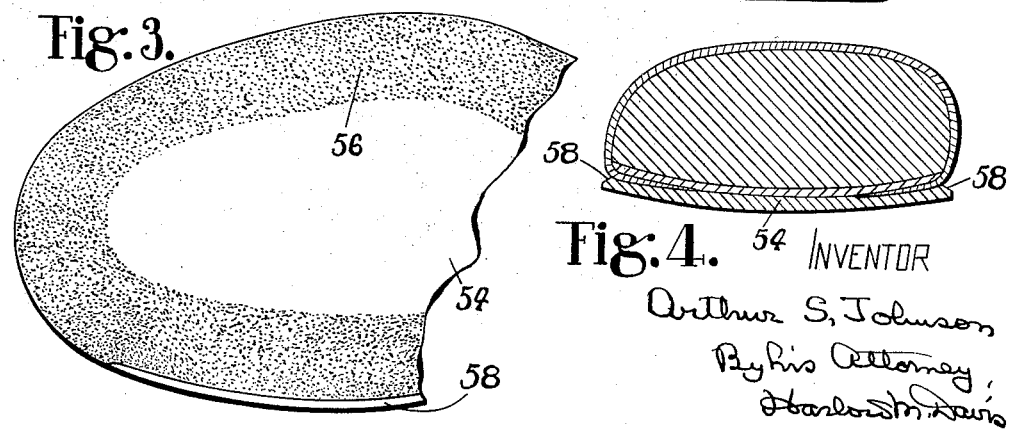
Fig. 3.
Fig. 4.
INVENTOR
Arthur S. Johnson
By his Attorney,
Harold M. Davis Patented Sept. 12, 1933

1,926,150

UNITED STATES PATENT OFFICE 1,926,150

TRIMMING MACHINE

Arthur S. Johnson, Beverly, Mass., assignor to United Shoe Machinery Corporation, Paterson, N. J., a corporation of New Jersey Application January 28, 1931. Serial No. 511,809

13 Claims. (Cl. 69—16)

This invention relates to trimming machines and is herein illustrated as embodied in a machine more especially designed to bevel the margins of soles for boots and shoes. The illustrated machine is also capable of beveling other articles such as belts.

For purposes of setting forth the principles of the present invention, former beveling machines may be divided into two classes, viz, those in which the effective width of the beveling cutter is limited to the predetermined width of the beveled face to be formed thereby, and those in which the beveling cutter is wider and affords a range of variation in the width of the beveled face to be formed thereby. The first of these classes requires the substitution of cutters of various widths to produce beveled surfaces of various widths.

On the other hand, beveling machines of the other type, as heretofore constructed, have not been provided with any means for insuring uniform beveling of relatively thick and relatively thin work-pieces or of work-pieces having portions that differ in thickness. Consequently they cut more stock from a thick work-piece than from one not so thick, and, if a work-piece is thicker at one point than at another, the beveling cut is wider and deeper at a thick point than at a thin point. Variations in the width and in the depth of the beveling cut may also be caused by chips and other extraneous matter that sometimes becomes lodged between the back of a work-piece and the element by which the work-piece is maintained against the cutter.

A typical example of work that presents a problem due to uneven thickness is the beveling of outsoles intended to be attached to shoes with cement only. For a shoe of this type an outsole is cut substantially to its final shape and size before it is attached. The shank-portion of such an outsole is commonly reduced to a thickness less than that of the forepart and of the heel-seat portion. The procedure commonly followed in making a shoe of this type requires beveling the margin of the attaching face of the outsole before laying the sole, and the problem referred to above consists in maintaining uniform width and depth of the beveling cut notwithstanding the lesser thickness of the shank portion of the sole compared to the thickness of the other portions.

In view of these conditions an object of the present invention is to provide an improved trimming machine whereby soles and other articles of work may be beveled, and in which the width and the depth of the beveling cut may be regulated without changing cutters but will be unaffected by the thickness of the work-pieces or by chips or other extraneous matter on the backs of the work-pieces.

With this object in view a feature of the present invention consists in a beveling machine in which the cutting portion of the beveling cutter is partially masked by work-guiding means provided with angularly related trough-forming surfaces spaced apart to form a slot through and beyond which an edge of the work may be projected to be beveled by the cutter, and the trough-forming surfaces being arranged to engage respectively the surfaces of the work that meet to form the edge to be beveled. Preferably, and as herein shown, the invention also provides means arranged to maintain the work-piece against the cutter and against one, at least, of the angularly related trough-forming surfaces of the work-guiding means which limit the approach of the work-piece to the cutter and thereby insure uniform beveling irrespective of variations in the thickness of the work-piece. Moreover, the angularly related trough-forming surfaces are preferably formed on relatively adjustable members between which the work-receiving slot lies and by which the width of this slot may be varied to regulate the width and the depth of the beveling cut.

To insure smooth and satisfactory trimming, the cutting edges of the trimming cutter should be sharp. It has been found in practice, however, that when the cutting edges have been used to trim about twenty pairs of leather soles they become so dull that they will not perform satisfactory work until they are sharpened. Consequently, when this work is done with a cutter that has only one operative band it becomes necessary frequently to interrupt the work, remove the cutter from the machine, sharpen the cutter, and reattach it to the machine before the work can continue, with the result that a large proportion of time is lost because of these interruptions.

With a view to reducing the number of interruptions necessitated by dulling the cutter, another object of the present invention is to provide for an increase in the output of a trimming machine by reducing the number of sharpening operations necessary to maintain the cutter in a satisfactory condition.

To this end and in accordance with a novel feature of the invention, the illustrated machine comprises work-guiding means forming a slot through and beyond which an edge of a work-piece may be inserted, a cutter having a cutting edge extending across but movable lengthwise of the slot to trim an edge inserted therethrough, the available length of the cutting edge being at least twice as great as the width of the slot, and provisions for relatively adjusting the work-guiding means and the cutter widthwise of the slot to place a sharp portion of the cutting edge in operating position when another portion of the edge is dull. In the illustrated example, the length of the cutter is sufficient to provide four operative bands which, with each sharpening, will trim four times as many work-pieces as a cutter having only one operative band.

The novel aspects of the method herein disclosed of applying adhesive cement to the attaching face of a sole and removing surplus cement from a marginal band of that surface constitute the subject-matter of a divisional application Serial No. 650,323, filed January 5, 1933.

Referring to the accompanying drawing,

Fig. 1 is an elevation, partly in section, of the right-hand side of a sole-beveling machine embodying the several features of the present invention;

Fig. 2 is a top-plan view, partly in section, of portions of the machine shown in Fig. 1;

Fig. 3 is a top-plan view of a portion of a sole, the margin of which has been beveled throughout a portion of its length; and Fig. 4 is a cross-sectional view through the forepart of a cement lasted shoe provided with an outsole that has been beveled in the manner illustrated in Figs. 1 and 3.

The machine illustrated in Fig. 1 is designed to stand on a bench, the frame 10 being provided with a flat base 12 and with two spaced bosses 14 and 16 in which a horizontal cutter-shaft 18 is journaled. The shaft 18 carries a rotary cutter 20 which is detachably secured thereto by a screw 22. The forward end of the shaft is provided with an extension 24 of reduced diameter which enters a bore in the cutter. This extension and the bore of the cutter are slightly tapered to insure a tight fit when the attaching screw 20 is set up tightly. The shaft 18 is also provided with a pulley 26 by which it is driven, and with a loose pulley 28 both located between the bosses 14 and 16. The driving connection between the pulley 26 and the shaft comprises a stud 30 screwed into the pulley, and a groove 32 in the shaft, this form of connection providing for endwise adjustment of the shaft for a purpose hereinafter explained.

The periphery of the cutter is provided with a series of cutting edges 34 to which an edge of a work-piece may be presented as illustrated in Fig. 1, but the cutting edges are partially masked by means forming a slot through and beyond which the edge of the work-piece must project to reach the cutter. As herein illustrated, the work-receiving slot is between the lower portions of two individual cutter-guards or trimming gages 36 and 38 which are separated by a space 35 and provided with oppositely beveled work-guiding surfaces 60 and 62 respectively. Each guard or gage consists of a hollow block having a circular chamber to receive the cutter. The two gages 36 and 38 are affixed individually to a supporting member 40 by clamping bolts 42. A slot 44 in the supporting member 40 provides for adjusting the gage 36 toward and from the gage 38 for the purpose of regulating the width of the slot through which the work-piece must project to reach the cutter. A screw 46 carried by the gage 36 is arranged to abut the gage 38 and thus to regulate the width of the work-receiving slot.

The supporting member 40 is affixed to a collar 48 by a clamping bolt 50 and is provided with a slot 52 which permits adjusting movement lengthwise of the axis of the cutter for a purpose hereinafter explained. The collar 48 surrounds one end of the boss 14 and is secured thereto by a set-screw 49.

Fig. 3 represents the forepart of an outsole 54 that has been partially prepared for attachment to a cement-lasted shoe of the type illustrated in Fig. 4. The sole is of leather and the margin of its attaching face has been coated with an adhesive (represented by stippling 56) which is commonly permitted to set before the sole is subjected to any further treatment or operation. Before the outsole is laid, and while the coating of adhesive 56 is dry or hard, it is desirable not only to remove the adhesive from that portion of the sole that will project from the upper-crease of the finished shoe, but also to bevel the marginal extension sufficiently to enable the shield of an edge-trimming cutter to run in the crease. As illustrated in Fig. 3, the margin of the sole has been beveled at 58 at one side only, this figure representing an intermediate stage of the beveling operation performed by the mechanism shown in Figs. 1 and 2. In Fig. 4, the outsole is represented as having been beveled at both sides as indicated at 58.

The oppositely beveled work-guiding surfaces 60 and 62 of the gages 36 and 38 are arranged to engage respectively the two angularly related surfaces of the work-piece which meet to form the edge to be beveled. Since the width of the work-receiving slot limits the extent to which an edge of the work-piece may project into the field of operation of the cutter, the adjustment provided by the slot 44 serves to regulate the width and the depth of the beveling cut.

To insure uniform beveling, the machine is provided with a work-support or table 64, the effect of which is to maintain the work-piece against the cutter 20 and against the work-guiding surface 60 of the guard or gage 36. The operator feeds the work-piece manually between the work-support 64 and the member 36 and at the same time maintains the work-piece against the edge-gage 38. As herein illustrated, the work-support 64 is spring-pressed toward the cutter, and it not only maintains the upper face of the work-piece against the guiding surface 60 with a slight clamping action but it also supplements the upward force exerted by the operator to maintain the bounding face of the work-piece against the guiding face 62 of the edge-gage 38.

The work-support 64 is provided with a stem 66 by which it is connected to a guiding sleeve 68, and is also provided with a pin 70 that extends through a hole formed in a lateral extension 72 of the sleeve to prevent the work-support from turning about the axis of the stem. A light compression spring 74 enclosed in the sleeve 68 exerts its force upwardly against the stem 66. When no work-piece is interposed between the work-support and the trimming gage 36, upward movement of the work-support is limited by nuts 76 on a screw-threaded rod 78 carried by the stem 66 and forming an extension thereof. These nuts provide for adjusting the work-support according to the thinnest portion of a work-piece, but a relatively coarse adjustment may be obtained by shifting the sleeve 68 up or down relatively to a supporting arm 80 through which the sleeve extends.

The arm 80 is provided with a set-screw 82 by which the sleeve may be secured at any desired level. This construction also provides for turning the sleeve and the work-support about the axis of the sleeve for purposes of angular adjustment. The arm 80 is affixed to the frame 10 by a clamping bolt 84 and a nut 86 which, when loosened, permit angular movement of the arm about the axis of the bolt to place the work-support in the most desirable position relative to the trimming gages 36 and 38. The bolt 50 and the slot 52 provide for adjusting the edge-gage 38 horizontally toward and from the work-support with a view to clearing the latter but at the same time insuring a work-engaging position of the guiding surface 62.

Referring to Fig. 1, it may be observed that the available length of the cutting edges 34 is about four times as great as the width of the work-receiving slot which corresponds to the operative band of the cutter. The non-operative bands of the cutter are available to replace the operative band whenever the latter becomes dull, merely by effecting relative adjustment of the cutter on the one hand or the gages 36 and 38 on the other hand lengthwise of the cutter. The clamping bolt 50 and the slot 52 provide for shifting the gages to various positions along the length of the cutter, but when the character of the work is such as to require a work-support of the type shown it is preferable not to disturb the relation between the gages and the work-support but to shift the cutter instead. Consequently, the illustrated construction also provides adjustable means by which the cutter-shaft 18 may be shifted endwise to place first one sharp band and then another successively in register with the slot through which the work-piece is to be presented to the cutter.

For this purpose the rear portion of the cutter shaft is turned down to provide a head 88 and a neck 90 connecting the head and the body of the shaft. The groove thus formed is occupied by a forked member 92, the shank portion 94 of which is adjustably secured to the rear bearing boss 16 by a clamping nut 96 and a screw 98 projecting laterally from the boss and affixed thereto. A suitable range of adjusting movement of the forked member is provided by a slot 100 formed in the shank. As shown, a groove 102 is formed in the shank 94 to receive a corresponding rib formed on the boss 16 for the purpose of maintaining the shank in parallel relation to the shaft 18.

The driving connection between the pulley 26 and the cutter-shaft, comprising the stud 30 and the groove 32, is a form of spline which enables the shaft to slide in the pulley. Consequently, when the operative band of the cutter becomes dull a sharp band, if one remains, may be brought into play merely by loosening the nut 96, sliding the forked member 92 in the right direction and tightening the nut. The width of the gages 36 and 38 is sufficient to mask the non-operative band or bands of the cutter.

Having thus described my invention, what I claim as new and desire to secure by Letters Patent of the United States is:

1. A beveling machine comprising a beveling cutter, means for operating said cutter, and work-guiding means by which the cutting portion of the cutter is partially masked, said work-guiding means being provided with two angularly related trough-forming surfaces spaced apart to form a slot through and beyond which an edge of a work-piece may be projected to be beveled by said cutter, said trough-forming surfaces being arranged to engage respectively the surfaces of the work-piece that meet to form the edge to be beveled.

2. A beveling machine comprising a beveling cutter, and stationary means arranged to mask one or more cutting portions of the cutter, said means consisting of two spaced members relatively adjustable one toward and from the other to provide a slot of regulatable width through and beyond which an edge of the work may be projected to be beveled by the cutter, and said members being provided with angularly related trough-forming surfaces for engaging, respectively, those angularly related surfaces of the work-piece which meet to form the edge inserted through said slot.

3. A trimming machine comprising a trimming cutter and mechanism for operating it, a spring-pressed member arranged to maintain a work-piece against the cutter, and means arranged between the cutter and said spring-pressed member to guide the work-piece past the cutter and to sustain the pressure applied to the work-piece by said member, said means having a slot through and beyond which an edge of the work-piece must project to be trimmed by the cutter.

4. A trimming machine comprising a trimming cutter and mechanism for operating it, a spring-pressed member arranged to maintain a work-piece against the cutter, and means arranged between the cutter and said spring-pressed member to guide the work-piece past the cutter and to sustain the pressure applied to the work-piece by said member, said means having angularly related trough-forming surfaces arranged to engage respectively two intersecting surfaces of the work-piece that meet to form an edge and also having, between said trough-forming surfaces, a slot through and beyond which said edge of the work-piece must project to be trimmed by the cutter.

5. A trimming machine comprising a trimming cutter and mechanism for operating it, a spring-pressed member arranged to maintain a work-piece against the cutter, and two spaced work-guiding members arranged side by side and having oppositely beveled surfaces arranged to engage angularly related edge-forming surfaces of the work-piece, said members being relatively adjustable one toward and from the other to provide a slot of regulatable width through and beyond which an edge of the work-piece musts project to be trimmed by the cutter.

6. A trimming machine comprising a trimming cutter and mechanism for operating it, means arranged under the cutter to guide a work-piece past the cutter, said means being provided with oppositely inclined work-guiding surfaces spaced apart to form a slot through which a margin of a work-piece must project to be trimmed by the cutter, and means arranged to support a margin of a work-piece against the cutter and against one, at least, of said work-guiding surfaces.

7. A beveling machine comprising a beveling cutter, hollow means surrounding the cutter and forming a slot through and beyond which an edge of a work-piece must be inserted to be beveled by said cutter, said means having two angularly related work-guiding surfaces at opposite sides, respectively, of the slot to engage the angularly related surfaces that form said edge of the work-piece, means arranged to maintain the work-piece against the cutter and against one, at least, of said work-guiding surfaces, and means for operating said cutter.

8. A trimming machine comprising work-guiding means forming a slot through and beyond which an edge of a work-piece may be inserted, a cutter having a cutting edge extending across said slot but movable lengthwise of the slot to trim an edge inserted therethrough, the available length of said cutting edge being at least twice as great as the width of the slot, provisions for relatively adjusting said means and said cutter widthwise of the slot to place a sharp portion of the cutting edge in operative position when another portion thereof is dull, and means for operating said cutter.

9. A trimming machine comprising a rotary cutter having one or more peripheral cutting edges the available length of which is greater than the width of the swath to be cut thereby, means for operating said cutter, and work-guiding means arranged to cover one or more bands of the periphery of the cutter but having a slot by which another band of the cutter is exposed for operation on an edge of a work-piece inserted through the slot, said work-guiding means and said cutter being relatively adjustable widthwise of said bands without altering the width of said slot.

10. A trimming machine comprising a rotary cutter having one or more peripheral cutting edges the available length of which is greater than the width of the swath to be cut thereby, means for operating said cutter, and work-guiding means arranged to cover one or more bands of the periphery of the cutter but having a slot by which another band of the cutter is exposed for operation on an edge of a work-piece inserted through the slot, and means by which said cutter may be adjusted axially to place one or another of its bands in register with said slot.

11. A trimming machine comprising a rotary cutter having one or more peripheral cutting edges the available length of which is greater than the width of the swath to be cut thereby, means for operating said cutter, and work-guiding means arranged to cover one or more bands of the periphery of the cutter but having a slot by which another band of the cutter is exposed for operation on an edge of a work-piece inserted through the slot, said work-guiding means being adjustable widthwise of said bands.

12. A trimming machine comprising a rotary cutter having one or more peripheral cutting edges the available length of which is greater than the width of the swath to be cut thereby, means for operating said cutter, two stationary work-guiding members spaced apart lengthwise of said cutter to form a slot through and beyond which an edge of a work-piece must be inserted to reach the cutter, said members being relatively adjustable to vary the width of said slot, and means by which said cutter may be adjusted axially to place one or another of its bands in register with said slot.

13. A trimming machine comprising a frame, a driven cutter-shaft journaled therein, a cutter carried by said shaft and having peripheral cutting edges the available length of which is greater than the width of the swath to be cut thereby, hollow means fixed with respect to said frame and arranged to surround the periphery of said cutter, said means being provided with a slot to expose a band of the cutter for operation on an edge of a work-piece inserted through the slot, and adjustable means arranged to shift said shaft endwise to place one or another of the bands of the cutter in register with said slot.

ARTHUR S. JOHNSON.